US006856418B2

(12) United States Patent
Cheney

(10) Patent No.: US 6,856,418 B2
(45) Date of Patent: *Feb. 15, 2005

(54) METHOD FOR SELECTIVE REPLACEMENT OF DISCRETE PRINT MEDIA PATH COMPONENTS

(75) Inventor: Douglas A. Cheney, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 914 days.

This patent is subject to a terminal disclaimer.

(21) Appl. No.: 09/800,068

(22) Filed: Mar. 6, 2001

(65) Prior Publication Data

US 2002/0140965 A1 Oct. 3, 2002

(51) Int. Cl.[7] ................................................ G06K 15/00

(52) U.S. Cl. ...................................... 358/1.15; 358/1.12

(58) Field of Search .......................... 358/1.1, 1.4, 1.5, 358/1.14, 1.12, 1.15; 309/9, 11, 12, 16, 18, 24, 31, 36

(56) References Cited

U.S. PATENT DOCUMENTS

| | | | | |
|---|---|---|---|---|
| 5,272,503 A | | 12/1993 | LeSueur et al. | |
| 5,594,529 A | | 1/1997 | Yamashita et al. | |
| 5,682,140 A | * | 10/1997 | Christensen et al. | 340/540 |
| 5,873,009 A | | 2/1999 | Yamashita et al. | |
| 5,950,038 A | | 9/1999 | Okui | |

* cited by examiner

*Primary Examiner*—Arthur G. Evans

(57) ABSTRACT

A printing device has a number of discrete components in a path traversed by print media. The number of uses of each discrete component in the print path is individually monitored and recorded. The number of individual uses of at least one discrete component is provided at the printing device and/or over a communications network.

17 Claims, 3 Drawing Sheets

METHOD FOR SELECTIVE REPLACEMENT OF DISCRETE PRINT MEDIA PATH COMPONENTS

FIELD OF THE INVENTION

This invention relates to printing devices, and more particularly to the maintenance of printing devices.

BACKGROUND

Printing devices such as laser printers, computer printers, facsimile machines, and copy machines are commonly used to print images on media. The media used is typically paper, but other media is often printed upon with a printing device. Further, images printed on media by printing devices are diverse, including text, photographs, graphics, and other data. Referring to FIG. 1, a block diagram of a typical printing device 100 is shown. The printing device may be a laser printer, ink cartridge printer, copy machine, or other device for printing images onto media. The printing device 100 typically includes three major sets of components: a print media feed 102, a marking engine 104, and a print media collector 106. Print media is supplied from the print media feed 102 to the marking engine 104, where information is printed onto the print media. After printing, the print media is moved into the print media collector 106. In many printing devices 100, the print media feed 102 includes at least one print media storage tray 108, 110, 112. In such printing devices, multiple print media storage trays 108, 110, 112 are provided to accommodate supplies of different sizes of print media, such as paper. The print media storage trays 108, 110, 112 and the marking engine 104 often are configured to move relative to one another to facilitate providing different sizes of print media to the marking engine 104. While three print media storage trays 108, 110, 112 are shown, different models of printing devices 100 use fewer trays or more trays. The print media feed 102 typically has a number of moving parts used to move print media into the marking engine 104. Adjacent to the first tray 108, a first print media feeder 114 pulls print media from the first print media storage tray 108 as needed, and supplies that print media to the marking engine 104. The first print media feeder 114 commonly includes one or more rollers. However, additional or different mechanisms are used as the first print media feeder 114 in different printing devices 100; for this reason the first print media feeder 114 is shown simply as a block in the block diagram. Similarly, adjacent to the second print media storage tray 110, a second print media feeder 116 pulls print media from the second print media storage tray 110 as needed, and supplies that print media to the marking engine 104. Adjacent to the third print media storage tray 112, a third print media feeder 118 pulls print media from the third print media storage tray 112 as needed, and supplies that print media to the marking engine 104. As with the first print media feeder 114, the second print media feeder 116 and the third print media feeder 118 are shown as simple representations of feeder mechanisms, and different mechanisms are used in different models of printing device 100.

Print media travels from the print media feed 102 along a print media path 137 through the marking engine 104. The marking engine 104 is typically an ink- or toner-based marking system. The marking engine 104 guides the print media along the path 137 such that images are printed upon it by a laser cartridge, an ink cartridge, an LED print head, an electrostatic print head, or another device by which images are printed on media. In the example shown, the print media path 137 travels through a first marking engine mechanism 120, a second marking engine mechanism 122, and a third marking engine mechanism 124. The marking engine mechanisms 120, 122, 124 guide print media along the print media path 137. The marking engine mechanisms 120, 122, 124 each commonly include one or more rollers. However, additional or different marking engine mechanisms 120, 122, 124 are used in different printing devices 100; for this reason the marking engine mechanisms 120, 122, 124 are shown simply as blocks in the block diagram. For example, one or more of the marking engine mechanisms 120, 122, 124 may be used for marking print media. More or fewer marking engine mechanisms 120, 122, 124 are used in different models of printing device 100 to move print media through the marking engine 104.

After the marking engine 104 prints onto the print media, that media is translated out of the marking engine 104 into the print media collector 106. The print media collector 106 generally includes at least one output tray 126, 128, 130. Multiple output trays 126, 128, 130 are typically included, providing for flexibility in print media output and handling. The output trays 126, 128, 130 and the marking engine 104 often are configured to move relative to one another to facilitate receiving print media in different output trays 126, 128, 130. While three output trays 126, 128, 130 are shown, different models of printing devices 100 use fewer outputs or more outputs. As an example, a printing device 100 that is a copy machine may have ten or more output trays to facilitate collation. The print media collector 106 typically has a number of moving parts used to receive print media from the marking engine 104. Adjacent to the first output tray 126, a first print media receiver 132 receives print media from the marking engine 104 and guides it into the first output tray 126. The first print media receiver 132 commonly includes one or more rollers. However, additional or different mechanisms are used as the first print media receiver 132 in different printing devices 100; for this reason the first print media receiver 132 is shown simply as a block in the block diagram. Similarly, adjacent to the second output tray 128, a second print media receiver 134 receives print media from the marking engine 104 and guides it into the second output tray 128. Adjacent to the third output tray 130, a third print media receiver 136 receives print media from the marking engine 104 and guides it into the third output tray 130. As with the first print media receiver 132, the second print media receiver 134 and the third print media receiver 136 are shown as simple representations of receiver mechanisms and different mechanisms are used in different models of printing machine 100. In some models of printing device 100, a single print media receiver 132 is used, which transfers the print media into a finishing device such as a stapler, hole puncher, or binding device. Such finishing devices are commonly utilized in business, industrial and government.

Typically all of the print media that passes through the printing device 100 is handled by all of the marking engine mechanisms 120, 122, 124. However, different print media feeders 114, 116, 118 are used to feed different sizes or types of print media into the marking engine 104. For example, when a single piece of print media is fed from the first tray 108 into the marking engine 104 by the first print media feeder 114, the second print media feeder 116 and the third print media feeder 118 are idle. Thus, the print media feeder associated with a print media storage tray containing a commonly-used print media size or type is utilized more often than the print media feeders associated with print media storage trays containing less-frequently used print media sizes or types. Similarly, different print media receivers 132, 134, 136 may be used to receive different units of print media from the marking engine 104. For example, when a sheet of print media is received from the marking engine 104 into the first print media receiver 132, the second print media receiver 134 and the third print media receiver 136 are idle. Thus, the print media receiver associated with a particular output tray typically is utilized more often than the other print media receivers. For example, most print jobs only require the delivery of a single copy of the print job into a default output tray, so the other output trays and their associated print media receivers are used less frequently. Table 1 illustrates the differential use of discrete print media path components with an example, in which 56,000 individual sheets of paper have been printed using the printing device 100.

TABLE 1

Example of Differential Use of Discrete Print Media Path Components

| Discrete Print Media Path Component | Individual Sheets Processed |
|---|---|
| First Print Media Feeder 114 | 40,000 |
| Second Print Media Feeder 116 | 6,000 |
| Third Print Media Feeder 118 | 10,000 |
| Marking Engine Mechanisms 120, 122, 124 | 56,000 |
| First Print Media Receiver 132 | 55,000 |
| Second Print Media Receiver 134 | 500 |
| Third Print Media Receiver 136 | 500 |

In this example, the first print media feeder 114 is used in conjunction with a commonly-used paper size such as 8½×11 inch paper, placed in the first print media tray 108. The other two print media trays 110, 112 contain paper sizes used less frequently, reflected in the corresponding lesser use of the second print media feeder 116 and the third print media feeder 118. Each of the 56,000 individual sheets that moves through the printing device 100 passes through each of the marking engine mechanisms 120, 122, 124. The first print media receiver 132 corresponds to the default print media output tray 126, such that it receives most of the paper output from the marking engine mechanisms 120, 122, 124. The second print media output tray 128 and the third print media output tray 130 are used less frequently, reflected in the corresponding lesser use of the second print media receiver 134 and the third print media receiver 136.

Different discrete components used to handle print media within the printing device 100 wear at differential rates, because some discrete components encounter heavier usage than others. The discrete components within the printing device 100 typically require periodic replacement due to wear. Such discrete components include the print media feeders 114, 116, 118, the marking engine mechanisms 120, 122, 124, and the print media receivers 132, 134, 136. Other moving parts in the print media path 137 used in addition to or instead of those parts may need periodic replacement as well. Wear is typically measured by counting and recording the number of units of print media that are processed through the printing device 100. A formatter 150 typically performs such counting and recording.

The formatter 150 may be an integrated circuit, a portion of an integrated circuit, a processor, or any other structure or combination of structure and software adapted to monitor the number of uses of each discrete component. The formatter 150 is connected via wiring or via a wireless connection to the print media feed 102, marking engine 104, and print media collector 106, such that the formatter 150 can control these components. The print media feed 102, marking engine 104 and the print media collector 106 each include standard wiring, motors, and other electrical and mechanical components used for actuation, control, and printing. The particular configuration of the electrical and mechanical components within the print media feed 102, marking engine 104 and the print media collector 106 are not critical to the invention.

The particular format of the digital input received by the formatter 150 varies among printing devices 100. The content of that digital input typically includes information, separated by page, relating to the image to be placed onto each particular sheet of print media. A logical signal or set of signals is associated with each page. Thus, the digital input is formatted and printed correctly on a sheet-by-sheet basis. By counting each received logical signal, or set of logical signals, associated with a single unit of print media, the formatter 150 counts the number of individual units of print media printed upon by the printing device 100, and stores the count within the formatter 150 or an associated memory device. In other printing devices 100, a sensor is used to physically sense individual units of print media printed upon in the printing device 100.

In one embodiment, a display 142 is connected to the formatter 150. The display 142 may be a liquid crystal display (LCD), one or more light-emitting diodes (LEDs), or any other device capable of displaying information to a user. The formatter 150 is also connected to a communications interface 152, which may be a modem, a network interface card, or any other device that allows the formatter 150 to communicate with an external device. Digital input is received into the formatter 150 via the communications interface 152, and output may be transmitted through the communications interface 152 from the formatter 150.

Typically, after the formatter 150 records a particular number of units of print media as having been printed upon, a display 142 or other alert on the printing device 100 is activated, indicating that service is required. The formatter 150 does not record the actual usage of individual print media path components. Instead, it simply counts and records the number of units of print media processed through the printing device 100. Replacement intervals for print media path components typically are based on the recorded number of processed pages. However, as described above, while all discrete print media path components are subject to wear, not every component is used for each page processed. Therefore, at a particular replacement interval, print media path components may be replaced that do not need to be replaced. For example, after a particular page count has been reached, all of the print media path components are typically replaced, including the print media feeders 114, 116, 118, is the marking engine mechanisms 120, 122, 124, and the print media receivers 132, 134, 136 are all replaced. However, some of those replaced components may have useful life remaining. Their premature replacement results in additional cost and maintenance time.

SUMMARY

The number of uses of individual discrete components within a printing device is monitored to facilitate the replacement of worn components.

In one aspect of the invention, a printing device has a number of discrete components in a path traversed by print media. The number of uses of each discrete component in the print path is individually monitored and recorded. As a result, worn components can be replaced individually while other discrete components with remaining useful life are left in place, resulting in cost and maintenance savings for the owner of the printing device.

In another aspect of the invention, the number of individual uses of at least one discrete component is provided at the printing device and/or over a communications network. By providing access to this information at the printing device or remotely, a user can monitor wear of the printing device. By providing this information remotely, maintenance personnel can be summoned, and replacement parts can be ordered automatically, without the need for user intervention.

The invention will be more fully understood upon consideration of the detailed description below, taken together with the accompanying drawings.

BRIEF DESCRIPTION OF THE DRAWINGS

Use of the same reference symbols in different figures indicates similar or identical items.

DETAILED DESCRIPTION

Figure 1:
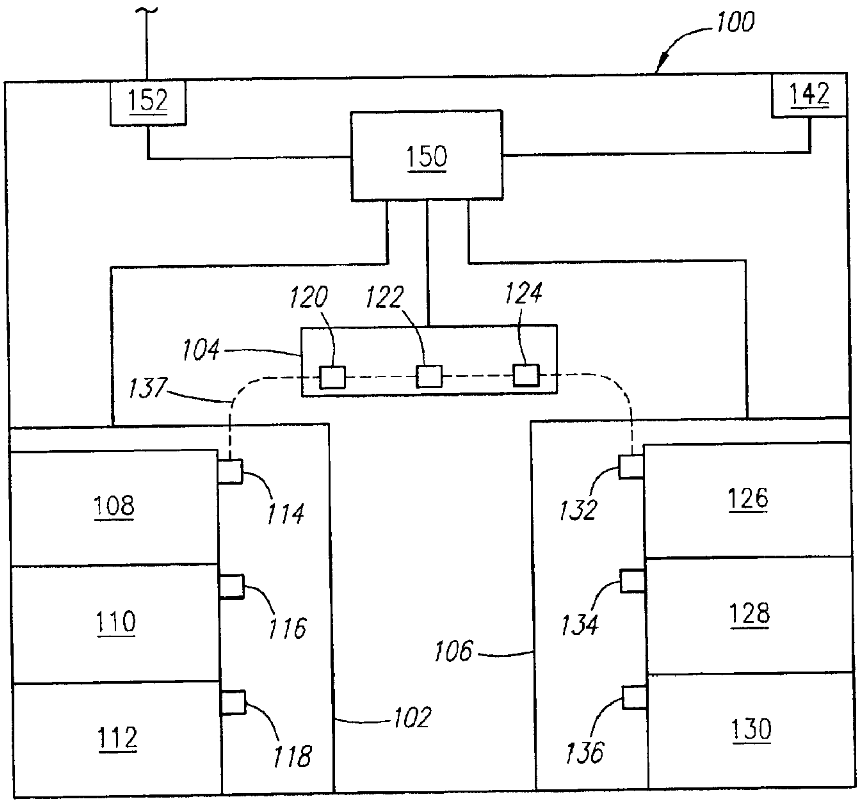
FIG. 1 (PRIOR ART)
FIG. 1 is a block diagram of a prior art printing device.
Figure 2:
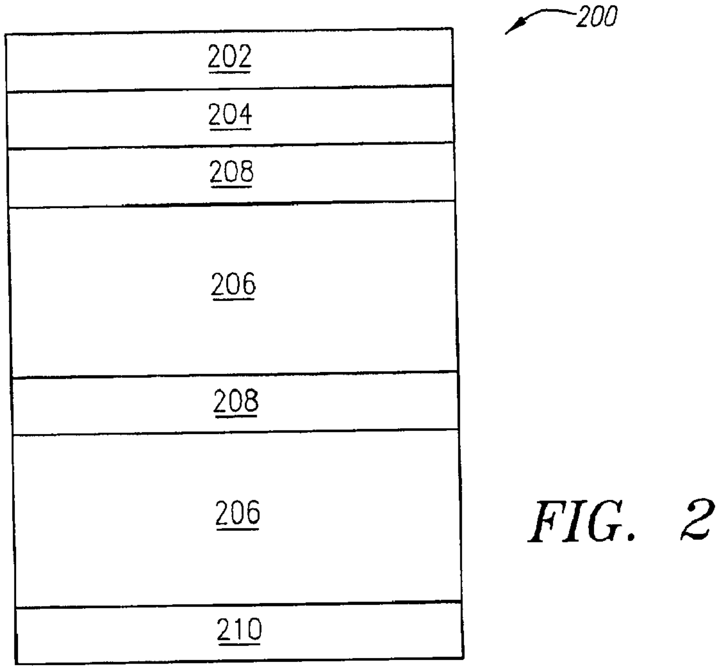
FIG. 2 is a block diagram of digital input transmitted to the printing device.

In one embodiment, the printing device 100 is substantially as described above. Referring to FIG. 2, an exemplary block diagram of representative digital input transmitted to the printing device 100 is shown. In one embodiment, FIG. 2 represents a single print job 200 transmitted to the printing device 100. The transmission of a print job to a printing device 100 is standard in the art. The particular format, and particular organization of a print job or jobs, represented by FIG. 2 are not important.

In one embodiment, the print job 200 includes several elements. A print media size block 202 includes data relating to the size or type of print media to be used for printing. An output tray block 204 includes data relating to the particular destination output tray 126, 128, 130 into which printed media should be deposited. Content blocks 206 include the image content to be printed upon individual units of print media within the printing device 100. Each content block 206 includes content data associated with a single unit of print media. The content blocks 206 are each identified by a page identifier 208, which may be a data word, a particular bit in a data word, a flag, or any other digital signal. Finally, an end designator 210 may be used to signal the end of the print job 200. Like the page identifier 208, the end designator 210 may be a data word, a particular bit in a data word, a flag, or any other digital signal.

Figure 3:
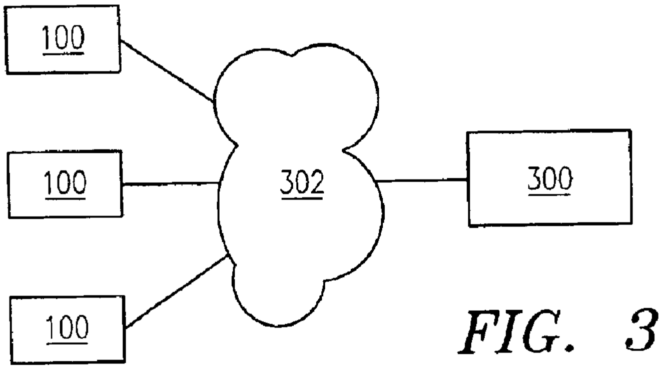
FIG. 3 is a schematic diagram of a number of printers connected to a remote information handling system.

Referring as well to FIG. 3, a number of printing devices 100 are connected to a remote information handling system 300 via a communications network 302. The printing devices 200 each include a communications interface 202 for connection to the communications network 302. The remote information handling system 300 may be, for example, a personal computer, a mainframe computer, or a server. The communications network 302 may be, for example, a local area network or the Internet. By connecting the printing devices 100 to the remote information handling system 300, additional functionality may be obtained, as described in greater detail below. Further, while only a single remote information handling system 300 is shown, additional remote information handling systems 300 may be connected to the printing devices 100 through the communications network 302, such that multiple remote information handling systems 300 can monitor the printing devices 100. Further, a single remote information handling system 300 may be connected to a single printing device 100, such as in a home office or small office.

The formatter 150 receives the digital input of the print job 200, then acts on it. That is, the formatter 150 receives the print job 200, including content 206 to be printed and instructions 202, 204, 208, 210 for printing those images on media, then processes the content 206 according to the instructions 202, 204, 208, 210 by actuating the appropriate components of the print media feed 102, marking engine 104 and the print media collector 106. In one embodiment, the formatter 150 receives the digital input of the print job 200 from a remote information handling system 300 via the communications interface 152.

Figure 4:
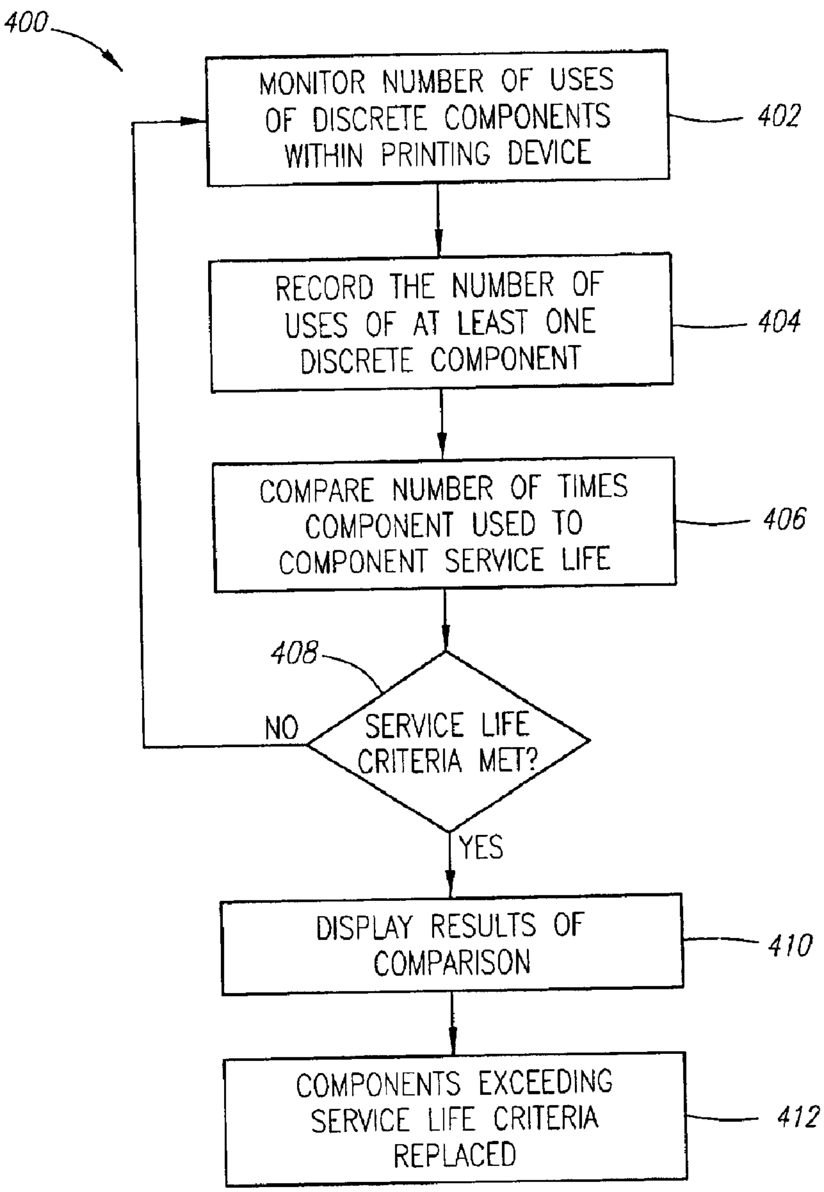
FIG. 4 is a flow chart illustrating a method of an embodiment of the invention.

Referring as well to FIG. 4, a method 400 for monitoring and selectively replacing discrete print media path components is shown. First, in block 402, the formatter 150 monitors the number of uses of discrete components in the print path within the printing device, such as the print media feeders 114, 116, 118, the processing mechanisms 120, 122, 124, and the print media receivers 132, 134, 136. In one embodiment, this monitoring is performed at the formatter 150 by monitoring the instructions 202, 204, 208, 210 transmitted as a part of each incoming print job 200. By monitoring the instructions 202, 204, 208, 210 used to transmit commands to the print media feed 102, marking engine 104 and the print media collector 106, the formatter 150 can monitor the use of each discrete component 114, 116, 118, 120, 122, 124, 132, 134, 136 by monitoring the instructions sent to them, rather than monitoring feedback from those discrete components. The formatter 150 counts the page identifiers 208 in the print job 200, and uses that count in conjunction with the print media size information in the print media size block 202 and the output tray information in the output tray block 204 to determine the particular mechanisms used to move the print media and count the number of uses of each such particular mechanism for that print job 200.

Block 402 can be further described by example. Referring to FIG. 2, the print job 200 includes print media size information 202, output tray information 204, content 206, page identifiers 208 and an end designator 210, as described above. The formatter 150 receives the print job 200 via the communications interface 152. In this example, the print media size information 202 includes data specifying 8.5×11 inch paper. The exemplary print job 200 includes two pages of content 206, each identified by an associated page identifier 208. The formatter 150 processes the print media size information 202, which requests 8.5×11 inch paper, and selects the particular print media storage tray 108, 110, 112 containing that size paper. In this example, the first print media storage tray 108 contains 8.5×11 inch paper. The first print media storage tray 108 is associated with the first print media feeder 114, which pulls 8.5×11 inch paper from the first print media storage tray 108. The formatter 150 then counts the page identifiers 208 in the print job 200 to determine how many sheets of paper will be taken from the first print media storage tray 108 by the first print media feeder 114. That is, the number of sheets of 8.5×11 paper associated with the number of page identifiers 208 equals the number of uses of the first print media feeder 114. The formatter 150, having counted the page identifiers in the print job 200 to determine that two sheets of paper will be fed from the first print media storage tray 108, determines that the first print media feeder 114 will be used twice during the course of the print job 200.

Also in this example, the output tray information 204 specifies a default output tray. The formatter 150 processes the output tray information 204, which requests the default output tray, and selects the default output tray. In this example, the default output tray is the first output tray 126. The first output tray 126 is associated with the first print media receiver 132, which receives print media into the first output tray 126 from the marking engine 104. The formatter 150, having counted the page identifiers 208 in the print job 200 to determine that two sheets of paper will be fed into the first output tray 126, determines that the first print media receiver 132 will be used twice during the course of the print job 200.

With regard to the marking engine 104, each sheet of paper in the print job 200 must pass through it. Because the formatter 150 counted two page identifiers 208 in the print job 200, two sheets of paper will be fed through it. Thus, the formatter 150 determines that the first marking engine mechanism 120, the second marking engine mechanism 122, and the third marking engine mechanism 124 each will be used twice during the course of the print job 200.

Consequently, in this example, in block 402 the formatter 150 determines that the first print media feeder 114, the first print media receiver 132, the first marking engine mechanism 120, the second marking engine mechanism 122, and the third marking engine mechanism 124 each are used twice during the course of the print job 200.

Next, in block 404, the formatter 150 records the number of uses of at least one discrete component used in the print job 200. Preferably, the formatter 150 records the number of uses of each discrete component used in the print job 200. In one embodiment, the formatter 150 stores this information in memory within itself, but this information may be stored in a separate memory storage unit, if desired. The recording performed in block 404 is cumulative across print jobs. That is, a running count is maintained of the number of uses of each discrete component, where that count is maintained across separate print jobs.

Next, in block 406, the formatter 150 compares the number of times each discrete component has been used to its corresponding service life. Alternately, this comparison may be made outside the formatter 150 in another information handling system. This comparison may be made after each record is updated in block 404. In another embodiment, this comparison is made at fixed time intervals, such as daily. In another embodiment, this comparison is made each time a fixed number of signals of measured uses have been received in block 404. For example, in such an embodiment the comparison may be made after one hundred total signals (indicating one hundred uses) have been received from the discrete components as a group. The service life of each component is measured as a number of uses. For example, the print media feeders 114, 116, 118 may each have a service life of fifty thousand sheets. After the service life has been exceeded, a component may be more likely to break and less likely to function optimally. In one embodiment, the formatter 150 stores the service life of each of the discrete components that it monitors. For example, the formatter 150 may store the service life of the print media feeders 114, 116, 118, the processing mechanisms 120, 122, 124, and the print media receivers 132, 134, 136. Such storage may be performed by a separate device, such as random-access memory, connected to the formatter 150, if desired. The formatter 150 compares the stored service life of each component with the number of uses of that component recorded in block 404. Such a comparison is standard in the art, and may be performed with software, in hardware, or a combination of the two.

Next, in block 408, the formatter 150 determines if the service life of any of the discrete components has been reached or exceeded. If in the comparison block 406 none of the components meet or exceed their respective service lives, then the method moves from block 408 back to block 402. If in the comparison block 406 any of the components are found to meet or exceed their respective service lives, then the method 400 moves from block 408 to block 410.

In block 410, the results of the comparison of block 406 are displayed. These results may be shown on the display 142, on a remote information handling system 300, or both. The remote information handling system 300 may be at the location hosting the printing device 200, or at a different location, such as the facility of a business entity supporting the printing device 200. The results may be displayed in several formats. In one example, the display 142 pictorially highlights one or more specific components (e.g., the second print media feeder 116) as having met or exceeded their service life, and displays a message that the indicated component or components should be replaced. In another example, the display 142 lists the recorded number of uses of some or all of the components, and highlights the names of the component or components that have met or exceeded their service life. The specific format and content of the information shown on the display 142 are not critical to the invention. In the examples above, the same information could be displayed on a monitor or other viewing device associated with the remote information handling system 300.

In another embodiment, the results of the comparison of block 406 are not visually displayed in block 410, and instead an audio signal is generated to alert a user to attend to the printing device 200. In such an embodiment, the discrete components that need replacement may be identified within the printing device 200, such as by an LED flashing adjacent to any component that has met or exceeded its service life.

In another embodiment, the user optionally may display the number of times each discrete component has been used by querying the formatter 150, as by pressing a button on the printing device 200, or transmitting a request from a remote information handling system 300. Such a display at the user's request may take place at any time the user wishes to view such information.

Next, in block 412, a user replaces the discrete components indicated in block 410 as having exceeded their service life. By replacing only those components that have exceeded their service life, the user may save money and maintenance time. The components used more frequently than others will exceed their service life before other components. In one example, the first print media feeder 114, the first print media receiver 132, the first marking engine mechanism 120, the second marking engine mechanism 122, and the third marking engine mechanism 124 are used more frequently. If only those mechanisms 114, 120, 122, 124, 132 have met or exceeded their service life, then only those mechanisms 114, 120, 122, 124, 132 need be replaced; the other discrete print media path components 116, 118, 134, 136 may remain in place. Optionally, one or more of those other discrete print media path components 116, 118, 134, 136 may be replaced for convenience, if one or more of those discrete print media path components 116, 118, 134, 136 are close to the end of their service life. In this way, an additional maintenance call may be avoided.

In another embodiment, in block 410 the results of the comparison are displayed at a facility of a business entity responsible for servicing the printing device 200, and the replacement of block 412 is performed by a representative of that business entity. In another embodiment, either the printing device 200 or the remote information handling system 300 communicates directly with an information handling system at the facility of a business entity that supplies replacement parts, requesting replacement parts to be shipped to the location hosting the printing device 200. The parts may be shipped to the location hosting the printing device 200 before replacement, such that the hosting location need not stock replacement parts, or may is be shipped after replacement, such that the hosting location can refurbish its supply of replacement parts. In another embodiment, the printing device 100 includes a server (not shown) electrically connected to the communications interface 102. The server automatically transmits an electronic mail message to one or more preselected addresses in block 410 when one or more components need replacement. In one example, an electronic mail message may be sent to a vendor to automatically order replacement parts. In another embodiment, the server is a web server with a particular URL, and serves a page to a remote information handling system 300 on request. The page may contain information relating to the amount of use of each print media path component 114, 116, 118, 120, 122, 124, 132, 134, 136, printing device 100 status, and other information.

Figure 5:
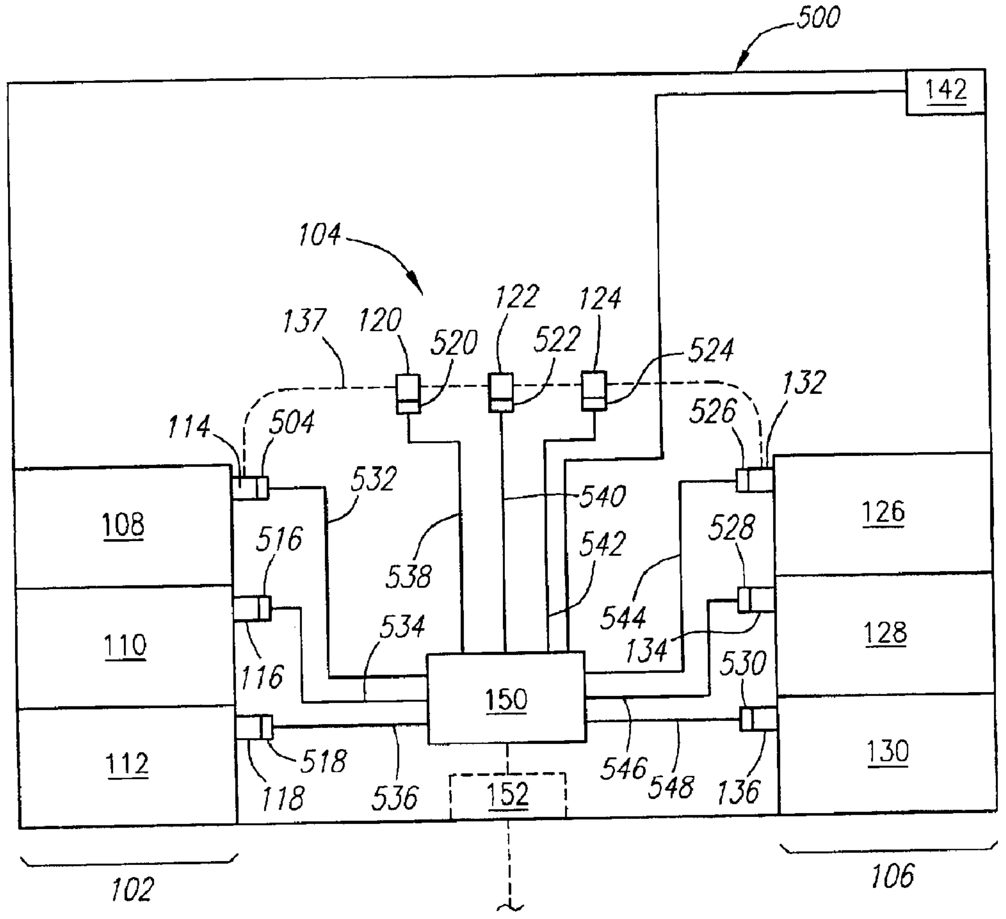
FIG. 5 is a block diagram of a printing device of an embodiment of the invention.

Referring to FIG. 5, another embodiment of a printing device 500 is shown. For brevity and clarity, only the differences between this printing device 500 and the printing device 100 above will be described in detail.

Each print media path component 114, 116, 118, 120, 122, 124, 132, 134, 136 is connected to a sensor that in turn is connected to the formatter 150, thereby allowing the formatter 150 to monitor the use of each discrete component 114, 116, 118, 120, 122, 124, 132, 134, 136. As opposed to the embodiment described above, in which the formatter 150 tracked information transmitted to the discrete components, this embodiment utilizes the formatter 150 to receive signals from sensors that detect individual uses of each discrete component. In one embodiment, the first print media feeder 114 is connected to a first print media feeder sensor 504. The first print media feeder sensor 504 may be any device capable of monitoring each use of the first print media feeder 114. For example, the first print media feeder sensor 504 may be a voltage or current sensor adapted to measure changes in the characteristics of the electricity utilized by the first print media feeder 114 in association with its motion. As another example, the first print media feeder sensor 504 may be a mechanical sensor adapted to record a use of the first print media feeder 114 when the first print media feeder 114 performs a certain motion, or when the first print media feeder sensor 504 mechanically detects the motion of a unit of print media through the first print media feeder 114. As another example, the first print media feeder sensor 504 may be an optical sensor that detects a reflective spot on the first print media feeder 114 at a certain point during its sheet-feeding motion. Other configurations of the first print media feeder sensor 504 may be used. The particular configuration and physical characteristics of the first print media feeder sensor 504 is not critical to the invention. The first print media feeder sensor 504 is also connected to the formatter 150, in one embodiment with a cable 532. However, the first print media feeder sensor 504 instead may communicate with the formatter 150 over a wireless connection.

Similarly, the second print media feeder 116 is connected to a second print media feeder sensor 516. As with the first print media feeder sensor 504, the second print media feeder sensor 516 may be any device capable of monitoring the use of the second print media feeder 116. The second print media feeder sensor 516 is also connected to the formatter 150, such as by a cable 534. The third print media feeder 118 is connected to a third print media feeder sensor 518. As with the first print media feeder sensor 504, the third print media feeder sensor 518 may be any device capable of monitoring the use of the third print media feeder 118. The third print media feeder sensor 518 is also connected to the discrete component counter 501, such as by a cable 536. The print media feeder sensors 504, 516, 518 preferably are the same kind of sensor, but may be different from one another if desired.

In one embodiment, the first marking engine mechanism 120 is connected to a first marking engine mechanism sensor 520. The first marking engine mechanism sensor 520 is preferably the same as or similar to the first print media feeder sensor 504 described above. However, the first marking engine mechanism sensor 520 may be any device capable of monitoring the use of the first marking engine mechanism 520. The first marking engine mechanism sensor 520 is also connected to the formatter 150, such as by a cable 538. The second marking engine mechanism 122 is connected to a second marking engine mechanism sensor 522. As with the first marking engine mechanism sensor 520, the second marking engine mechanism sensor 520 may be any device capable of monitoring the use of the second marking engine mechanism 122. The second marking engine mechanism sensor 522 is also connected to the formatter 150, such as by a cable 540. The third marking engine mechanism 124 is connected to a third marking engine mechanism sensor 524. As with the first marking engine mechanism sensor 520, the third marking engine mechanism sensor 524 may be any device capable of monitoring the use of the third marking engine mechanism 124. The third marking engine mechanism sensor 524 is also connected to the formatter 150, such as by a cable 542. The marking engine mechanism sensors 520, 522, 524 preferably are the same kind of sensor, but may be different from one another if desired.

In one embodiment, the first print media receiver 132 is connected to a first print media receiver sensor 526. The first print media receiver sensor 526 is preferably the same as or similar to the first print media feeder sensor 504 described above. However, the first print media receiver sensor 526 may be any device capable of monitoring the use of the first print media receiver 132. The first print media receiver sensor 526 is also connected to the formatter 150, such as by a cable 544. The second print media receiver 134 is connected to a second print media receiver sensor 528. As with the first print media receiver sensor 526, the second print media receiver sensor 528 may be any device capable of monitoring the use of the second print media receiver 134. The second print media receiver sensor 528 is also connected to the formatter 150, such as by a cable 546. The third print media receiver 136 is connected to a third print media receiver sensor 530. As with the first print media receiver sensor 526, the third print media receiver sensor 530 may be any device capable of monitoring the use of the third print media receiver 136. The third print media receiver sensor 530 is also connected to the formatter 150, such as by a cable 548. The print media receiver sensors 526, 528, 530 preferably are the same kind of sensor, but may be different from one another if desired.

Referring as well to FIG. 4, the method 400 for use with this embodiment of the printing device 100 differs from the method described above. In block 402, the formatter 150 monitors within the printing device 500 discrete components, such as the print media feeders 114, 116, 118, the processing mechanisms 120, 122, 124, and the print media receivers 132, 134, 136, through accompanying sensors 504, 516, 518, 520, 522, 524, 526, 528, 530. When a sensor 504, 516, 518, 520, 522, 524, 526, 528, 530 detects the use of its accompanying component, it transmits a signal to the formatter 150. The signal may be any signal, digital or analog, which can be interpreted by the formatter 150 as an indication that a discrete component has been used. As utilized in this document, the word "use" with regard to a discrete component of the printing device refers to an action taken by or wear experienced on that discrete component in association with its handling of a single sheet of print media. As one example, each sensor 504, 516, 518, 520, 522, 524, 526, 528, 530 may output a low ("0") digital signal when its associated component is not in use, and a high ("1") digital signal when its associated component is in use. As another example, each sensor 504, 516, 518, 520, 522, 524, 526, 528, 530 may output no signal when its associated component is not in use, and transmit an analog pulse when its associated component is in use. As another example, each sensor 504, 516, 518, 520, 522, 524, 526, 528, 530 may transmit a data word each time its associated component is in use, where the data word includes a header identifying the component and a bit set high ("1") to indicate that the component has been used.

Next, in block 404, the formatter 150 records the number of uses of each discrete component monitored in block 402. Recording can be accomplished in any manner that allows the formatter 150 to track the number of uses of each discrete component. Alternately, the formatter 150 does not itself record the number of uses of one or more discrete components, but instead performs the recording function in conjunction with another device, such as by directing another device such as a random-access memory to perform such recording, or by transmitting data to another device for recording. As one example, the formatter 150 may increment a discrete register associated with a particular component when it receives a digital or analog signal from the sensor 504, 516, 518, 520, 522, 524, 526, 528, 530 associated with that component. As another example, the discrete component counter may increment an entry in a database associated with a particular component when the formatter 150 receives a data word from the sensor 504, 516, 518, 520, 522, 524, 526, 528, 530 associated with that component.

Blocks 406–412 are performed substantially the same way in this embodiment as disclosed above with regard to the first embodiment.

While the invention has been described in terms of a set of moving print media path components, other components, moving or otherwise, may be used in addition to or instead of the disclosed print media path components to translate print media through the printing device 100. Further, the formatter 150 may be connected to additional or other components within the printing device 100, such as non-moving parts requiring periodic maintenance or replacement, and components that are not associated with the print media path 137.

Although the invention has been described with reference to particular embodiments, the description is only an example of the invention's application and should not be taken as a limitation. Consequently, various adaptations and combinations of features of the embodiments disclosed are within the scope of the invention as defined by the following claims and their legal equivalents.

What is claimed is:

1. A method for facilitating the replacement of discrete print media path components within a printing device, each discrete print media path component having a service life measured in number of uses, comprising:

monitoring a plurality of discrete print media path components of said printing device; and recording the number of individual uses of said plurality of discrete print media path components.

2. The method of claim 1, further comprising comparing the number of times at least one discrete component has been used with the service life of said discrete component.

3. The method of claim 2, further comprising replacing at least one discrete component based on the results of said comparing.

4. The method of claim 1, wherein said monitoring comprises:

receiving digital input in the form of a print job including page identifiers;

counting said page identifiers; and determining the number of individual uses of said discrete paper path components for said print job based on said counted page identifiers.

5. The method of claim 1, further comprising:

comparing the number of times each discrete component has been used with the service life of each discrete component; and replacing only the discrete components that have been used a number of times at least equal to said service life of the discrete component.

6. The method of claim 1, further comprising receiving a request for information, wherein said providing is performed in response to said request.

7. The method of claim 1, further comprising providing said number of times at least one discrete component has been used.

8. The method of claim 7, wherein said providing is performed when at least one discrete component has been used a number of times at least equal to said service life of the discrete component.

9. The method of claim 7, further comprising connecting the printing device to a communications network connected to a remote information handling system, wherein said providing is performed over a communications network.

10. The method of claim 9, wherein the printing device is located at a user site, and wherein said remote information handling system is located at said user site.

11. The method of claim 9, wherein the printing device is located at a user site, and wherein said remote information handling system is located away from the user site.

12. The method of claim 9, wherein said communications network is a local area network.

13. The method of claim 9, further comprising receiving a request from said remote information handling system to provide said number of times at least one discrete component has been used.

14. The method of claim 9, wherein said providing is performed at substantially fixed time intervals.

15. The method of claim 9, further comprising transmitting from said remote information handling system a request for at least one replacement component.

16. A method for facilitating the replacement of discrete print media path components within a printing device, each discrete print media path component having a service life measured in number of uses, comprising:

monitoring the discrete print media path components of said printing device;

recording the number of individual uses of the discrete print media path components;

providing said number of times the discrete print media path components have been used;

comparing the number of times each discrete print media path component has been used with the service life of each discrete print media path component;

replacing only said discrete print media path components that have been used a number of times at least equal to said service life of said discrete print media path component.

17. The method of claim 16, further comprising:

connecting the printing device to a communications network, and providing a user with data over communications network, wherein said providing comprises transmitting said number of times at least one discrete print media path component has been used to a remote information handling system.

* * * * *